(12) United States Patent
Doole et al.

(10) Patent No.: US 6,230,206 B1
(45) Date of Patent: May 8, 2001

(54) SYSTEM FOR INTERNODE DEADLOCK AVOIDANCE IN PARALLEL DATABASE SYSTEM USING AS OVERFLOW BUFFER A TEMPORARY TABLE STORAGE ALLOCATED TO THE PARALLEL DATABASE APPLICATION PROGRAM BEING EXECUTED

(75) Inventors: Douglas J. Doole, Don Mills; Paul C. Huffman, Aurora; John E. Lumby, Toronto, all of (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/185,257

(22) Filed: Nov. 2, 1998

(30) Foreign Application Priority Data

Apr. 8, 1998 (CA) .................................. 220612

(51) Int. Cl.$^7$ .................................. G06F 15/16
(52) U.S. Cl. .................. 709/235; 709/230; 709/231; 709/232; 709/233; 709/234; 712/28
(58) Field of Search .................. 709/230, 231, 709/232, 233, 234, 235; 712/28; 370/232, 235

(56) References Cited

U.S. PATENT DOCUMENTS

| 5,050,162 | * | 9/1991 | Golestani | 370/235 |
|---|---|---|---|---|
| 5,245,609 | * | 9/1993 | Ofek et al. | 370/235 |
| 5,361,371 | * | 11/1994 | Rege et al. | 709/234 |
| 5,574,933 | * | 11/1996 | Horst | 712/28 |
| 5,859,981 | * | 1/1999 | Levin et al. | 395/200.68 |
| 5,936,940 | * | 8/1999 | Marin et al. | 370/232 |
| 5,982,296 | * | 11/1999 | Wakasa et al. | 340/827 |
| 6,026,444 | * | 2/2000 | Quattromani et al. | 709/232 |
| 6,031,821 | * | 2/2000 | Kalkunte et al. | 370/235 |
| 6,105,070 | * | 8/2000 | Gaylord | 709/232 |

* cited by examiner

Primary Examiner—John A. Follansbee
Assistant Examiner—Nabil El-Hady
(74) Attorney, Agent, or Firm—Ronald L. Drumheller (57) ABSTRACT

The invention provides a method and apparatus including a programming product for a parallel data processing system having a plurality of nodes interconnected by communication paths, in which one or more sets of data present at one or more source nodes of the system is required to be sent on a plurality of communication paths having communication buffers to selected nodes of the database system for processing, a system of communicating the data over the paths between the nodes to avoid deadlocking the processing system, including: accessing data from the one or more source nodes in subsets of the data; sending the subsets of data on a plurality of paths to the selected nodes of the processing system; if a path of the paths intended for the sending of one or more of the subsets of data becomes blocked, suspending the sending of subsets of the data on the path for a predetermined time period; if the blocked path becomes capable of accepting additional data before the predetermined time period has expired, resuming the sending of subsets of data on the path; however, if the predetermined time period expires without the path becoming available, placing one or more subsequent subsets of data intended for the path into an overflow buffer; when the blocked path again becomes free, sending the subsets of data from the overflow buffer on the path to the intended recipient node for processing.

4 Claims, 5 Drawing Sheets

SYSTEM FOR INTERNODE DEADLOCK AVOIDANCE IN PARALLEL DATABASE SYSTEM USING AS OVERFLOW BUFFER A TEMPORARY TABLE STORAGE ALLOCATED TO THE PARALLEL DATABASE APPLICATION PROGRAM BEING EXECUTED

FIELD OF THE INVENTION

This invention relates to the processing of data in a parallel processing system and more particularly to methods and means of avoiding deadlocks in processing information caused by the overloading of one or more pathways between nodes involved in transferring portions of the information required for processing the information. The invention is particularly applicable to the processing of queries in a parallel database system in order to avoid deadlocking caused by the blockage of portions of the queries or data sought to be transferred between nodes of the system.

BACKGROUND OF THE INVENTION

While parallel processing offers significant advantages in the high speed processing of large volumes of information by routing and processing information on nodes of the system simultaneously, the processing can be deadlocked if some of the information is prevented from reaching its intended node or nodes preventing it from being applied with other information on the system or in proper sequence. This can happen if one or more of the internodal communication pathways that link the nodes of the parallel processing system are operating at capacity limiting the flow of information through them.

More particularly, during the processing of SQL statements by a shared-nothing, MPP (Massively Parallel Processor) database system, data must be moved between the computers (or nodes) that make up the database manager. The limited buffering available to communication lines connecting nodes combined with data skew between the nodes resulting from delayed information transmission between the nodes can result in a deadlock when the order of data records being processed must be preserved.

Previously these deadlocks were handled by changing the execution plan for the SQL statement. This requires developing techniques to recognize that a given plan may deadlock and then changing the plan to avoid the deadlock. In this approach the data processing plan is optimized by an SQL optimizer to generate the best performing plan, from the optimizer's viewpoint without taking into account the possibility of deadlocking, then changing the plan if necessary to avoid deadlocking.

As queries become more complex and SQL optimizers become more sophisticated, the detection of potential deadlocks becomes very difficult and the modified execution plan may not perform as efficiently as possible.

One reason behind the deadlocking problem is the limited in-memory buffering available to an internodal communication line. Theoretically this could be handled by increasing the number of communication buffers available, so that the database system can handle more extreme situations of data skew. Ultimately, by increasing the buffer size to a large enough size no deadlocks would occur. However, reality dictates limitations to buffer size.

While the problem of internodal deadlocking has been of concern since the advent of parallel processing systems it does not appear that a broadly applicable satisfactory solution to this problem has been found until the present invention was developed.

SUMMARY OF THE INVENTION

At present a database system usually can only devote a small amount of memory to communication buffers so it was important to find another solution if possible. It was found that if properly applied as described below, that other storage means such as disk storage could be used to expand the buffering capacity by providing a temporary overflow buffer. Databases, employ temporary tables for the handling of transient data. It has been found that these temporary tables can be employed to act as temporary overflow buffers for the communication buffer space used by internodal communication lines.

In the normal operation of internodal transfers when data is sent from one node of the database system to another node, the data being sent is normally placed in an in-memory communication buffer by the database management system and the buffer is (logically) sent to the other node, ie. made available to it.

While the manner in which buffers are established and used in different parallel processing database systems may differ it is believed to be useful to discuss one example. One particular manner in which buffers can be used to transfer information between nodes follows. A sending node requiring a buffer may ask the communication manager of the system which controls the communication to and from the sending node to assign a buffer for its use. The data from the sending node is then loaded into the buffer. The communication manager is instructed where the data is to be sent (ie. To which recipient node). The communication manager assumes control of the buffer and sends the data which was contained within it over a physical communication media to the recipient node. The communication manager at the recipient will receive the data, transferring it to a buffer for subsequent use by the recipient node. It should be reiterated that there are a number of ways in which internodal transmission of information can occur in conjunction with the use of buffers. It appears that this invention is not dependent on the particular implementation used by the communication system in use.

Returning to a description of the invention herein; if the communication line is congested, ie. loaded to capacity, an in-memory communication buffer will not be available. In this situation the data is written to a temporary table. Later, when the communication line is free, the data can be read from the temporary table and sent to the other node as originally intended.

As a parallel data processing system is designed to handle a large flow of data it is possible that, when an internodal communication line becomes free, there will be both data in the temporary table and new data that is ready to be sent. As is frequently the case, there is likely to be an ordering to the data, so that it must be received or processed in a particular sequence, for example, when then the oldest data in the temporary table requires sending before the new data it is useful to add the new data to the end of the table to preserve the data sequence if required. Then, once the oldest data is drawn from the temporary table the new data can be accessed.

This approach has been found to resolve the problem of inter-nodal deadlocks since the communication buffer is effectively increased to the size of the (disk) space allocated for temporary tables. In the case of extreme data skew (where there is insufficient disk space for the overflow buffers), the database system will likely report an out of disk space message rather than becoming deadlocked. This is preferable to a deadlock situation as the system administrator or operator of the data processing system will be notified by the database management system of the out of disk space condition, whereas the occurrence of a deadlock situation may not be readily apparent.

It is preferable to improve on the above described implementation of the invention to prevent large amounts of data from being written to temporary tables each time data is sent between nodes as follows:

In the situation where a sending node has more than one recipient node to which data is being sent the sending node should preferably use (ie. write to) the temporary table overflow buffer if one of the nodes is waiting for information to be sent. For example if nodes A and B are to be sent data by node S, but the communication line to A is congested data does not need to be written to the temporary file unless node B is waiting for information. If neither of the nodes needs data the sender S can wait until the communication line becomes available or another node becomes ready for data.

In yet another implementation a timer can be employed to delay writing data to the temporary table. This has proven to be useful as a communication line may be congested because the intended recipient node is performing work rather than reading from the communication line. An appropriate brief delay gives the recipient node a chance to read data from the line, allowing the sending node to send the new data on the communication line as its buffer space becomes available.

With this latter implementation of the invention the advantages of the use of temporary tables is achieved without impacting performance of the database system in most instances as unnecessary use of the temporary tables will be significantly reduced.

With this invention in use the SQL optimizer typically used by database management systems will be able to generate whatever plans that appear to offer the best performance without requiring the optimizer to take into account the necessity of avoiding potential deadlocks. As the invention is applied as a run-time solution it is only activated when necessary reducing the chances of a performance penalty caused by the use of disk space when there is no danger of the occurrence of a deadlock.

An embodiment of the invention provides, in a parallel data processing system having a plurality of nodes interconnected by communication paths, in which one or more sets of data present at one or more source nodes of the system is required to be sent on a plurality of communication paths having communication buffers to selected nodes of the database system for processing, a method of communicating the data over the paths between the nodes to avoid deadlocking the processing system, including:

accessing data from the one or more source nodes in subsets of the data;

sending the subsets of data on a plurality of paths to the selected nodes of the processing system;

if a path of the paths intended for the sending of one or more of the subsets of data becomes blocked, suspending the sending of subsets of the data on the path for a predetermined time period;

if the blocked path becomes capable of accepting additional data before the predetermined time period has expired, resuming the sending of subsets of data on the path;

however, if the predetermined time period expires without the path becoming available, placing one or more subsequent subsets of data intended for the path into an overflow buffer;

when the blocked path again becomes free, sending the subsets of data from the overflow buffer on the path to the intended recipient node for processing.

In the case of the processing of ordered data, when the blocked path becomes free the data subsets contained in the overflow buffer are preferentially sent to the recipient node before sending subsequent data subsets to the recipient node.

In the case of the processing of unordered data it is preferred to send the data present in the communication buffers of the path or other data of the sending node to the recipient node before sending data from the overflow buffer.

When a path has become blocked and wherein a sending node has a specific subset of data destined for the blocked path and also a portion of data (node blocking data) that must be cleared from the sending node so that the subsequent subset of the data blocked at the sending node can be sent to a path that is available for use to reach another node to permit resumption of processing, another aspect of the invention provides for sending the node blocking data to an overflow buffer from the blocked sending node to permit the specific data to be sent; and sending the specific subset of data to the intended recipient node for processing.

The data described above may comprise database instructions.

Another aspect of the invention provides apparatus for managing a parallel data processing system having a plurality of nodes interconnected by communication paths, in which one or more sets of data present at one or more source nodes of the system is required to be sent on a plurality of communication paths having communication buffers to selected nodes of the database system for processing, means for communicating the data over the paths between the nodes to avoid deadlocking the processing system, comprising:

means for accessing data from the one or more source nodes in subsets of the data;

means for sending the subsets of data on a plurality of paths to the selected nodes of the processing system;

timing means for timing a predetermined period of time;

control means responsive to the timing means adapted to:

(a) suspend the sending of subsets of data on the path if a path of the paths intended for the sending of one or more of the subsets of data becomes blocked, the data on the path for a predetermined time period;

b) resume the sending of subsets of data on the path, if the blocked path becomes capable of accepting additional data before the predetermined time period has expired;

c) place one or more subsequent subsets of data intended for the path into an overflow buffer if the predetermined time period expires without the path becoming available;

d) send the subsets of data from the overflow buffer on the path to the intended recipient node for processing, when the blocked path again becomes free.

Preferentially the apparatus of the invention may provide that the control means is adapted to send the data subsets contained in the overflow buffer to the recipient node before sending subsequent data subsets to the recipient node, for the processing of ordered data, when the blocked path becomes free The control means may preferentially be adapted to send the data present in the communication buffers of the path or other data of the sending node to the recipient node before sending data from the overflow buffer, for the processing of unordered data In another embodiment the apparatus of invention may provide that the control means is adapted to send node blocking data to an overflow buffer from a blocked sending node so that a subsequent subset of the data blocked at the sending node can be sent to a path that is available for use to reach a recipient node to permit resumption of processing.

The overflow buffer may be associated with the sending node or a recipient node.

The invention may be implemented as a program storage device readable by a machine, tangibly embodying a program of instructions executable by the machine to perform method steps for a parallel data processing system having a plurality of nodes interconnected by communication paths, in which one or more sets of data present at one or more source nodes of the system is required to be sent on a plurality of communication paths having communication buffers to selected nodes of the database system for processing, for communicating the data over the paths between the nodes to avoid deadlocking the processing system, the method steps including:

accessing data from the one or more source nodes in subsets of the data;

sending the subsets of data on a plurality of paths to the selected nodes of the processing system;

if a path of the paths intended for the sending of one or more of the subsets of data becomes blocked, suspending the sending of subsets of the data on the path for a predetermined time period;

if the blocked path becomes capable of accepting additional data before the predetermined time period has expired, resuming the sending of subsets of data on the path; however, if the predetermined time period expires without the path becoming available, placing one or more subsequent subsets of data intended for the path into an overflow buffer;

when the blocked path again becomes free, sending the subsets of data from the overflow buffer on the path to the intended recipient node for processing.

The method steps may preferably include for the processing of ordered data, when the blocked path becomes free sending the data subsets contained in the overflow buffer to the recipient node before sending subsequent data subsets to the recipient node.

The method steps may also provide for the case of the processing of unordered data sending the data present in the communication buffers of the path or other data of the sending node to the recipient node before sending data from the overflow buffer.

For the occurrence in which a path has become blocked and wherein a sending node has a specific subset of data destined for the blocked path and also a portion of data (node blocking data) that must be cleared from the sending node so that the subsequent subset of the data blocked at the sending node can be sent to a path that is available for use to reach another node to permit resumption of processing, the method steps may also include:

sending the node blocking data to an overflow buffer from the blocked sending node to permit the specific data to be sent;

sending the specific subset of data to the intended recipient node for processing.

The data may also include database instructions.

In yet another aspect of the invention it may be implemented in a computer program product including:

a computer usable medium having computer readable program code embodied therein for managing a parallel data processing system having a plurality of nodes interconnected by communication paths, in which one or more sets of data present at one or more source nodes of the system is required to be sent on a plurality of communication paths having communication buffers to selected nodes of the database system for processing, a method of communicating the data over the paths between the nodes to avoid deadlocking the processing system, the computer program product including:

computer readable program code for causing a computer to access data from the one or more source nodes in subsets of the data;

computer readable program code for causing a computer to send the subsets of data on a plurality of paths to the selected nodes of the processing system;

computer readable program code for causing a computer to time a predetermined period of time;

computer readable program code for causing a computer to effect control means responsive to the timing means adapted to:

a) suspend the sending of subsets of data on the path if a path of the paths intended for the sending of one or more of the subsets of data becomes blocked, the data on the path for a predetermined time period;

b) resume the sending of subsets of data on the path, if the blocked path becomes capable of accepting additional data before the predetermined time period has expired;

c) place one or more subsequent subsets of data intended for the path into an overflow buffer if the predetermined time period expires without the path becoming available;

d) send the subsets of data from the overflow buffer on the path to the intended recipient node for processing, when the blocked path again becomes free.

The control means is preferably adapted to send the data subsets contained in the overflow buffer to the recipient node before sending subsequent data subsets to the recipient node, for the processing of ordered data, when the blocked path becomes free The control means is preferentially adapted to send the data present in the communication buffers of the path or other data of the sending node to the recipient node before sending data from the overflow buffer, for the processing of unordered data The control means is also preferentially adapted to send node blocking data to an overflow buffer from a blocked sending node so that a subsequent subset of the data blocked at the sending node can be sent to a path that is available for use to reach a recipient node to permit resumption of processing.

BRIEF DESCRIPTION OF THE DRAWINGS

For a fuller understanding of the nature and advantages of the present invention, reference should be made to the following detailed description in conjunction with the accompanying drawings of which.

DESCRIPTION OF A SPECIFIC EMBODIMENT OF THE INVENTION

The invention may best be understood if read in conjunction with the following:

Communication Line—In this description, a communication line is an abstract view of the underlying communication media. A communication line may be considered simply as an object or system that moves rows from one node to another for the database manager. The communication line must guarantee delivery and that buffers or their contents will arrive in the order that they were sent. The actual physical network layout and communication protocol are irrelevant to this discussion.

Buffer—Again, an abstract concept not directly related to the physical implementation. A buffer is adapted to contain data or one or more rows that the database manager wishes to send from one node to another. A communication line typically can have only a limited or fixed number of buffers in transit at any time. (For instance, a database management system may have five buffers, but it should be understood that the number of buffers is not significant to this invention.)

Figure 1:
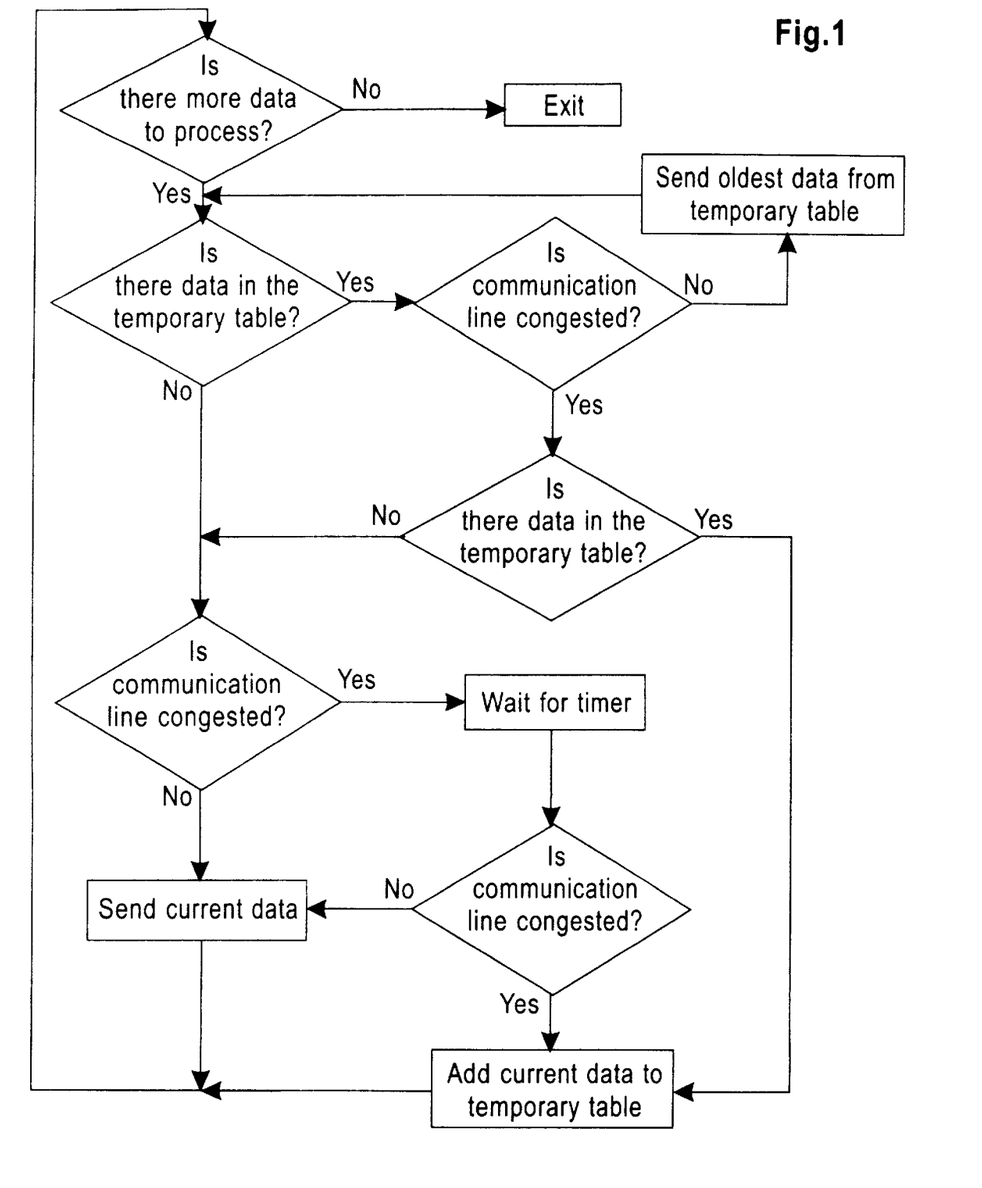
FIG. 1 is a flow chart of the preferred embodiment of the invention.

The preferred embodiment of the invention may be best understood by reference to the flow chart of FIG. 1 in which a specific embodiment is depicted, and by reference to the following pseudocode which illustrates the invention in a manner that may be readily understood by those developers or programmers familiar with the art to which this invention is pertinent. The punctuation used for the pseudocode will be recognized by those skilled in the C, or C++ programming languages.

Pseudocode

Assuming that both the timer and the temporary tables are controlled by the writer (ie. the sending node) (although they need not be as discussed subsequently in this description) this represents the logic used by the sending node (the reader's logic is unchanged (the reader is another term for the receiving node or recipient node).

```
while (data is available to send)
{
    if (data in temporary table)
    {
        //Try to send as much old data as possible
        while (communication line is not congested)
            take oldest data from temporary table, put in buffer and send
        //If there is still data in the temporary table, then add the new
        //data to it
        if (data in temporary table)
            add current data to it
    }
    if (no data in temporary table)
    {
        //Try to send the data
        if (communication line is not congested)
            put data in buffer and send
        else
        {
            //Give the reader a chance to consume some buffers
            start timer
            wait for timer to expire or communication line to become
            free
            //Either send or store the buffer
            if (communication line is not congested)
                put data in buffer and send
            else
                write data to temporary table
        }
    }
}
```

The advantages of the invention described in the pseudocode may be more appreciated by considering the following specific examples.

EXAMPLE 1

Figure 2:
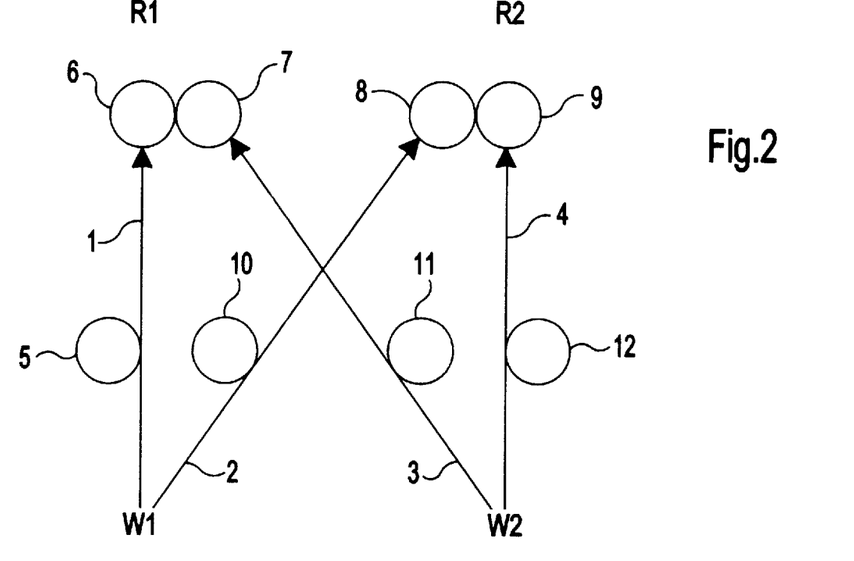
FIG. 2 is a depiction of a situation in which two nodes are sending sorted data to two nodes which are reading the data.

Referring to the example of FIG. 2 two nodes, W1 and W2 are depicted as transferring information to nodes R1 and R2.

Deadlocks are caused when one node of a database, eg. W1 or W2 is writing buffers (sending information) to more than one recipient node, eg. R1 and R2, but only a subset of the destination nodes, eg. in this case, node R1, or R2 are actively reading the buffers (receiving the information) being sent.

Two sending nodes (W1 and W2) are producing, ie. sending, sorted data to the two nodes (R1 and R2) which are to read the sorted data and keeping the results in sorted order. For the purpose of this example the sending nodes are going to direct their buffers (ie. send data) to the recipient node that requires them. For this example we assume that R1 will be processing odd numbers and R2 will be processing even numbers. In this system, each communication line 1, 2, 3, and 4 can have two buffers (depicted as circular objects) 5,6; 10, 8; 11, 7; and 12, 9, respectively, in transit. The data to be processed is represented by the values 1 through 10. In this example, a buffer can only hold a single value As stated above, the readers R1, and R2 will keep their results in sorted order. To do this, they need a buffer from each of their incoming communication lines 1, 3 for R1 and lines 2, 4 for R2, respectively. With a value received in a buffer from each of the lines, the smallest value can be determined as will be well appreciated by those skilled in the art. The buffer containing the smallest value will be processed and then a new buffer will be read and the cycle will repeat.

Figure 3:
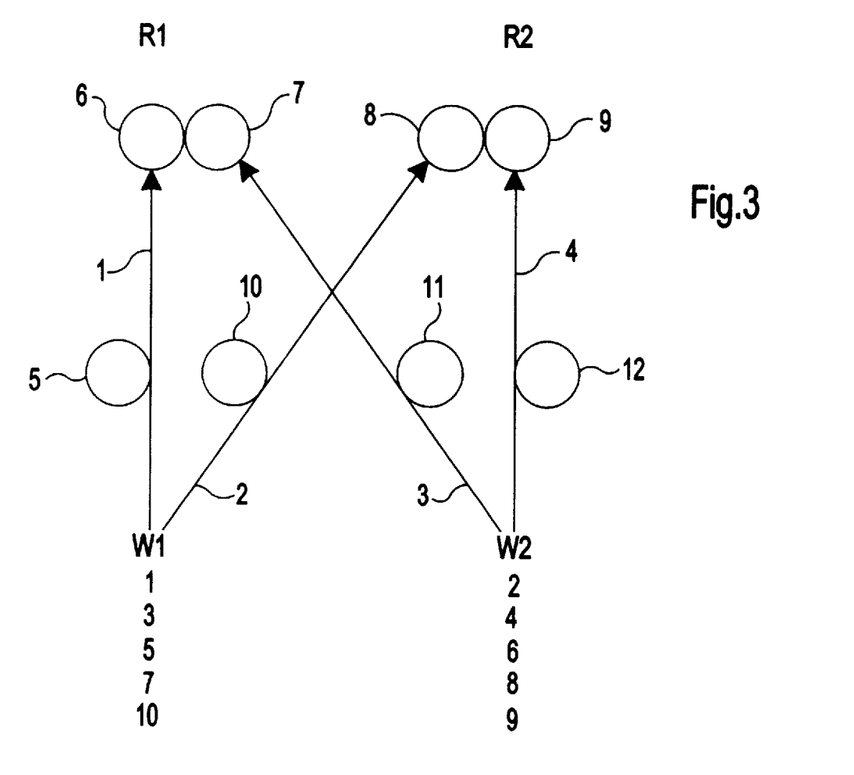
FIG. 3 is a depiction of the arrangement of FIG. 2 in which data is distributed in a particular order.

Referring to the example of FIG. 3 we consider a situation in which the initial data is distributed as shown, with node W1 seeking to send values 1, 3, 5, 7, 10; and node W2 seeking to send values 2, 4, 6, 8, 9.

Figure 4:
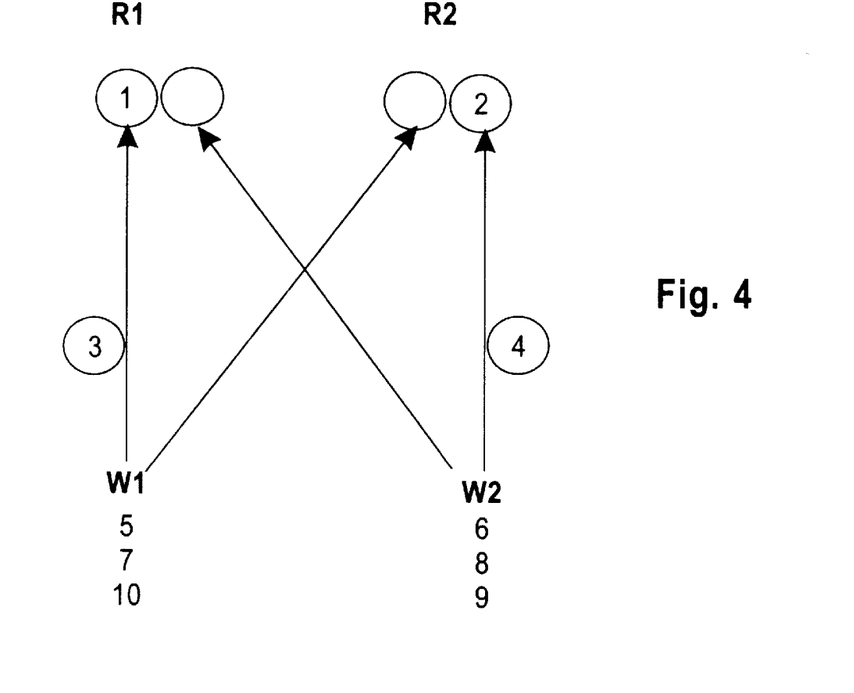
FIG. 4 is a depiction of the arrangement of FIG. 3 in which some processing has occurred.

Each of the sending nodes W1, and W2 will take the next available value (depicted in columnar fashion for convenience) and send it to the appropriate reader R1, or R2 in a buffer. For example, W1 will send the value "1" to R1 because it is odd. After some more processing, we end up with the situation depicted in FIG. 4 as described immediately below:

Neither R1 nor R2 can make any progress because neither of them has received the contents of a buffer of required data from their connections. Consider R1, it has received a buffer from W1 containing the value "1" but it has not received a buffer from W2. It cannot determine if "1" is the smallest value because it does not know what value will arrive from W2. Until a buffer from W2 is received, R1 cannot make any progress. Similarly, R2 has received a buffer from W2, but R2 is waiting for a buffer from W1.

Figure 5:
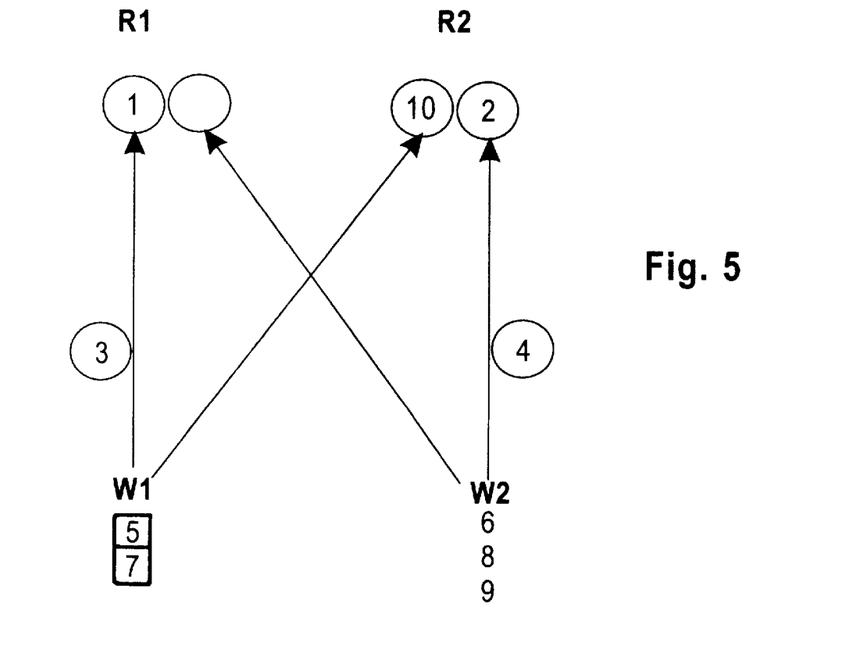
FIG. 5 is a depiction of the arrangement of FIG. 4 in which one embodiment of the invention has been introduced.

Also, neither W1 or W2 can make any progress because the next value to process is destined for a congested communication line. Consider W1; the next value for it to send is "5". Since this is an odd value, it should be sent to R1, but the communication line to R1 already has two buffers in transit. Until R1 reads a buffer, W1 will not be able to process the "5". Similarly, W2 is waiting to send "6" to R2, but that communication line is also congested. Since neither the readers nor the writers are making any progress it is apparent that the system is deadlocked. Referring to FIG. 5 the solution provided by the invention now may be appreciated. After the timer (not shown) provided by the invention expires, one or both of the writers W1 or W2 will start to overflow to a temporary table (With the variations in timing caused by network delay and node workload, the timer of one writer may expire before the other. If the first node to start overflowing can break the deadlock before the other node's timer expires, then only the one node will overflow.) For simplicity, this example will assume that only W1 starts to overflow. Any value that cannot be sent (such as the "5") is written to the temporary table 13.

Sending node W1 wrote the "5" and the "7" to the temporary table 13 which allowed it to send the "10" to recipient node R2. Node R2 can now make progress and processes the "2" and the "4". This allows sending node W2 to send the "6" and "8" to recipient node R2 followed by the "9" to recipient node R1. Node R1 can now process the "1" and the "3" which frees up the communication line 1. Since sending node W1 has data in the temporary table 13, it will read this and send the "5" and "7" to node R1. It will be appreciated that all the data has now been sent to the proper nodes and the deadlock has been broken.

EXAMPLE 2

This example, which is discussed in conjunction with FIGS. 6 to 9 illustrates another processing example that can result in deadlocking which may be remedied by the present invention.

This example originates with lazy evaluation of predicates in an SQL statement.

Figure 6:
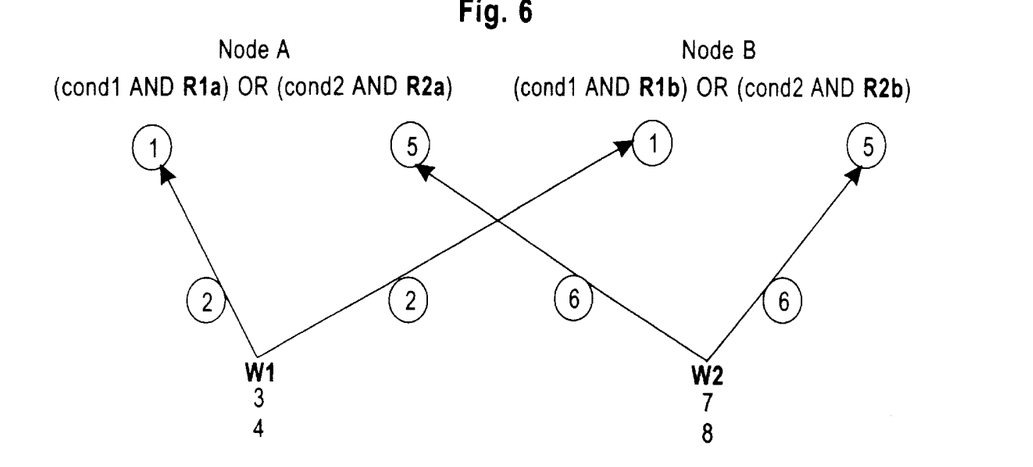
FIG. 6 is a depiction of the processing of an SQL statement.

Lazy evaluation means that only enough predicates will be evaluated to determine the truth or falsehood of the expression. For example, if the expression is A AND B, and A is false, then B will not be evaluated because the result of the predicate will be false, regardless of the value of B. Referring now to FIG. 6, consider a query that has the clause: "WHERE (cond1 AND subquery1) OR (cond2 AND subquery2)". Both subqueries require that data be read from a remote node. Cond1 and Cond2 represent conditional expressions that evaluate to true or false in this example.

In this example, each sending node W1, and W2 sends its values to all its recipients readers. Node W1 sends to readers R1a, R1b of nodes A, and B respectively while W2 sends to readers R2a, and R2b of node s A and B respectively (for example, when W1 processed the value "1", the value was sent to both R1a and R1b).

For the purposes of this example, cond1 is always true on Node A and always false on Node B. Also, cond2 is always false on Node A and always true on Node B. With lazy evaluation, an expression like (cond AND R) will always evaluate R if cond is true and never evaluate R if cond is false. Therefore, on Node A, R1a will always be executed (because cond1 is true) and R2a will never be executed (because cond2 is false). Similarly, on Node B R1 b will never be executed and R2b will always be executed. This leads to the situation depicted in FIG. 7.

Figure 7:
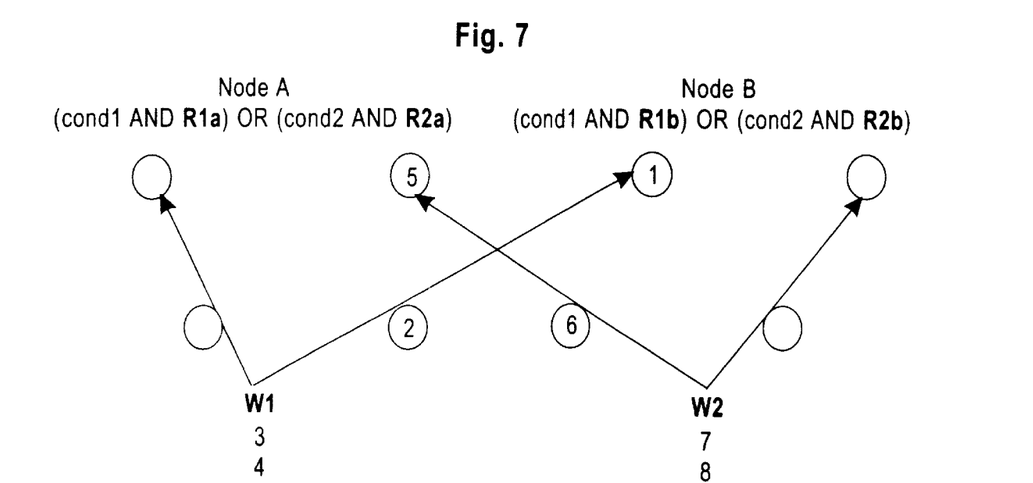
FIG. 7 is a depiction of the processing of an SQL statement as in FIG. 6 in which deadlocking has occurred.

Consider the condition of W1. It could send the "3" to R1a, but because the line to R1 b is congested it has to wait (it has nowhere to put the "3" destined for R1b). Similarly, W2 is waiting for the line to R2a to clear. R1a and R2b are waiting for more information so that they can proceed while R2a and R1b are never being called. Once again the system is deadlocked.

Figure 8:
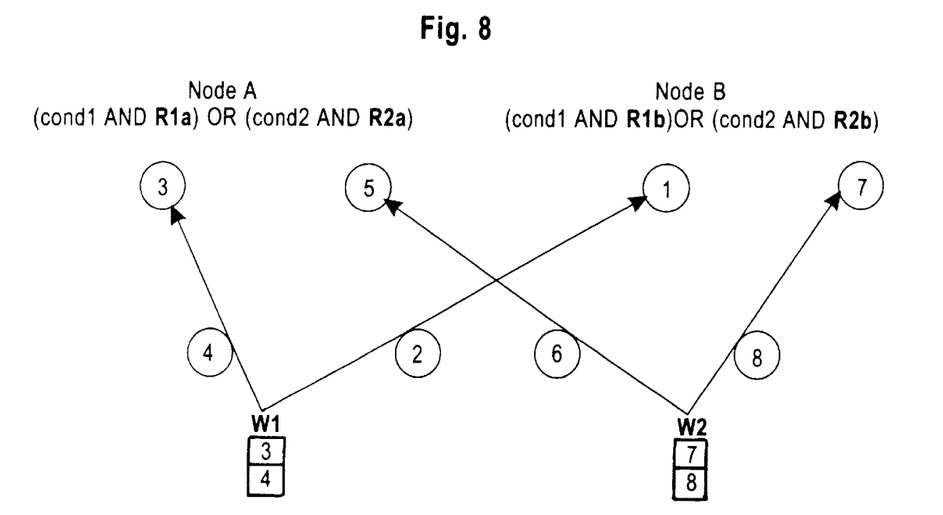
FIG. 8 is a depiction of the processing of an SQL statement in which temporary tables have been created in accordance with an embodiment of the invention to resolve the deadlocking problem of FIG. 7; and, FIG. 9 is a depiction of the subsequent state of the system of FIG. 8 after the processing of the query being illustrated.

Applying the invention herein, after the timer (not shown) expires, the sending node will create a temporary table that will be used to hold the values destined for congested lines. (In this example, both W1 and W2 will have to time out and overflow to a temporary table.) This is depicted in FIG. 8.

Figure 9:
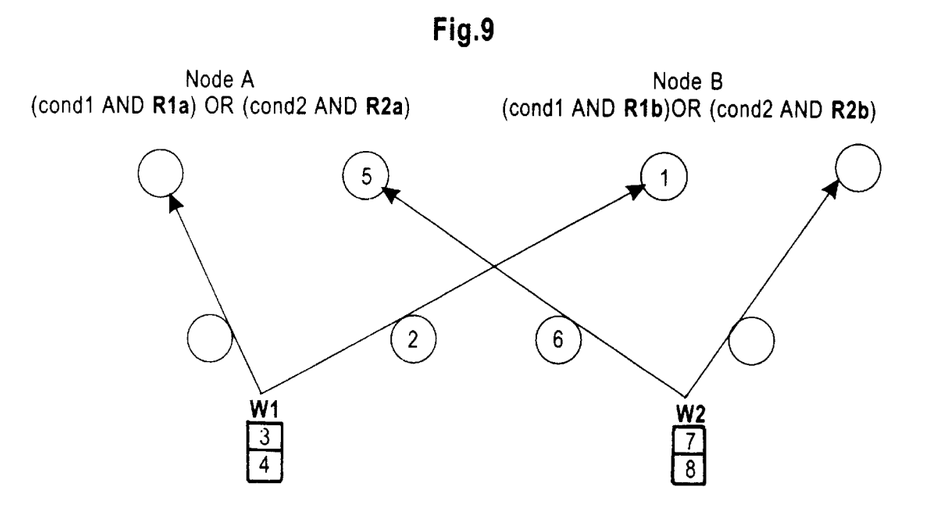

Node A can continue processing because R1a has more data. Once the "3" and "4" have been processed, Node A has done its work for this query. (Remember that in this example cond2 is always false on Node A so the second part of the OR condition never contributes to the result. Therefore, once the first part has been completely processed, the query is finished.) In the same manner, Node B consumes the values "7" and "8" and also finishes, leaving the system as depicted in FIG. 9.

Notice that there is still data in transit remaining in the system. This is not an unusual situation for a database manager.

Consider a select statement that has a result set of many rows. After fetching the first few rows, the application closes the cursor. As in this example, data is left in transit and the database manager needs to clean it up. The facilities that the database manager would normally use to remove unneeded data can be used to clean up the system. Since the ability to clean up unused data is typically provided in a database system, this description does not provide the details of this activity.

ALTERNATIVE EMBODIMENTS OF THE INVENTION

While the specific embodiment of the invention described above presumed that the timer was associated with or located in the sending or writing node it will be appreciated by those skilled in the art reviewing the description herein that the timer can alternatively be associated with or located in the recipient or reader node; however, if it is so then a communication line or other notification means is required to notify the sending or writer node that the timer has expired so that the appropriate action may be taken at the sending node.

While associating or placing the timer in the reader may increase the complexity of the code of the database manager, it can help prevent unnecessary overflow to temporary tables. This is accomplished by designing the reader's timer so that it only expires if none of the associated writers are providing buffers (ie. sending information).

The specific examples described above in conjunction with the drawings show the temporary table being created by the writer or sending node. It may be appreciated by those skilled in the art that it would be possible to have the temporary tables at or associated with the reader or recipient node if the reader was adapted to always consume incoming buffers and then save the ones not immediately usable in the temporary table.

An optimal value for the timer may be determined by choosing a value that balances the delay in recovering from a deadlock with the resource consumption of writing the temporary table.

In a parallel database management system with which the invention herein has been successfully implemented, the timer value was based on an estimate provided by the SQL statement optimizer used by the system. The SQL statement optimizer uses information about the system such as processor, network, and disk speed to estimate the time between the arrival of rows at the receiving node. To allow for variations in processing and network speed, this estimate was then doubled to provide the value for the timer. In addition the value for the timer was restricted to the range of 5 seconds to 10 minutes so that overflow would not be allowed to begin too quickly nor allowed to wait too long before beginning.

While the present invention has been described with reference to ceratin specific embodiments, it will be understood that the description is illustrative of the invention and is not to be construed as limiting the invention. Various modifications may occur to those skilled in the art without departing from the true spirit and scope of the invention as defined by the appended claims.

The embodiments of the invention in which an exclusive property or privilege is claimed are defined as follows:

1. In a parallel database system having a plurality of database processing nodes for processing database data in parallel, said database processing nodes being interconnected by a communication system having communication paths, each said communication path having communication buffers for transferring database data between database processing nodes along said each communication path and each said database processing node having temporary table storage for storing transient database data for said each database processing node, a method of avoiding deadlock in said parallel database system, comprising the steps of:

sending database data along a plurality of said communication paths, each said communication path connecting a first database processing node to a second database processing node using the communication buffers of said each communication path;

if a communication path of said plurality of communication paths becomes blocked for a predetermined period of time, using the temporary table storage of one of the first or second database processing nodes of said blocked communication path to form a temporary overflow buffer and transferring blocked data from said blocked communication path to the temporary overflow buffer until the blocked communication path becomes unblocked; and then after the blocked communication path becomes once again unblocked, returning the transferred data from the temporary overflow buffer back to the once again unblocked communication path wherein the temporary table storage being used as temporary overflow buffer is a resource of a parallel database application program being executed on the parallel database system.

2. Apparatus for managing a parallel database system having a plurality of database processing nodes for processing database data in parallel, said database processing nodes being interconnected by a communication system having communication paths, each said communication path having communication buffers for transferring database data between database processing nodes along said each communication path and each said database processing node having temporary table storage for storing transient database data for said each database processing node, said apparatus avoiding deadlock in said parallel database system, comprising:

means for sending database data along a plurality of said communication paths, each said communication path connecting a first database processing node to a second database processing node using the communication buffers of said each communication path; and control means responsive to a blocking of a communication path of said plurality of communication paths for a predetermined period of time for:

using the temporary table storage of one of the first or second database processing nodes of said blocked communication path to form a temporary overflow buffer, transferring blocked data from said blocked communication path to the temporary overflow buffer until the blocked communication path becomes unblocked, and then after the blocked communication path becomes once again unblocked, returning the transferred data from the temporary overflow buffer back to the once again unblocked communication path wherein the temporary table storage being used as temporary overflow buffer is a resource of a parallel database application program being executed on the parallel database system.

3. A program storage device readable by a machine, tangibly embodying a program of instructions executable by said machine to perform method steps for a parallel database system having a plurality of database processing nodes for processing database data in parallel, said database processing nodes being interconnected by a communication system having communication paths, each said communication path having communication buffers for transferring database data between database processing nodes along said each communication path and each said database processing node having temporary table storage for storing transient database data for said each database processing node, said method steps avoiding deadlock in said parallel database system and comprising:

sending database data along a plurality of said communication paths, each said communication path connecting a first database processing node to a second database processing node using the communication buffers of said each communication path;

if a communication path of said plurality of communication paths becomes blocked for a predetermined period of time, using the temporary table storage of one of the first or second database processing nodes of said blocked communication path to form a temporary overflow buffer and transferring blocked data from said blocked communication path to the temporary overflow buffer until the blocked communication path becomes unblocked; and then after the blocked communication path becomes once again unblocked, returning the transferred data from the temporary overflow buffer back to the once again unblocked communication path wherein the temporary table storage being used as temporary overflow buffer is a resource of a parallel database application program being executed on the parallel database system.

4. A computer program product comprising a computer usable medium having computer readable program code means embodied therein for managing a parallel database system having a plurality of database processing nodes for processing database data in parallel, said database processing nodes being interconnected by a communication system having communication paths, each said communication path having communication buffers for transferring database data between database processing nodes along said each communication path and each said database processing node having temporary table storage for storing transient database data for said each database processing node, said computer readable program code avoiding deadlock in said parallel database system and comprising:

computer readable program code means for sending database data along a plurality of said communication paths, each said communication path connecting a first database processing node to a second database processing node using the communication buffers of said each communication path; and computer readable program code means for making a computer responsive to a blocking of a communication path of said plurality of communication paths for a predetermined period of time to:

use the temporary table storage of one of the first or second database processing nodes of said blocked communication path to form a temporary overflow buffer, transfer blocked data from said blocked communication path to the temporary overflow buffer until the blocked communication path becomes unblocked, and then after the blocked communication path becomes once again unblocked, return the transferred data from the temporary overflow buffer back to the once again unblocked communication path wherein the temporary table storage being used as temporary overflow buffer is a resource of a parallel database application program being executed on the parallel database system.

* * * * *